(12) United States Patent
Toepke et al.

(10) Patent No.: US 9,210,581 B2
(45) Date of Patent: Dec. 8, 2015

(54) MAINTENANCE OF WIRELESS FIELD DEVICES

(75) Inventors: Todd Mitchell Toepke, Eden Prairie, MN (US); Joseph Citrano, III, Eden Prairie, MN (US); Alan Roger Dewey, Plymouth, MN (US); Alden Chester Russell, III, Minnetonka, MN (US); Eric D. Rotvold, West Saint Paul, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 235 days.

(21) Appl. No.: 12/780,112

(22) Filed: May 14, 2010

(65) Prior Publication Data

US 2010/0290351 A1    Nov. 18, 2010

Related U.S. Application Data

(60) Provisional application No. 61/178,757, filed on May 15, 2009.

(51) Int. Cl.
*H04B 7/00* (2006.01)
*H04W 16/18* (2009.01)
*G05B 19/418* (2006.01)

(52) U.S. Cl.
CPC ........... *H04W 16/18* (2013.01); *G05B 19/4185* (2013.01); *G05B 2219/23406* (2013.01); *G05B 2219/24167* (2013.01); *G05B 2219/25062* (2013.01); *G05B 2219/31131* (2013.01)

(58) Field of Classification Search
CPC ......... H04L 41/12; H04L 45/02; H04L 45/00; H04L 45/04; H04L 41/04
USPC ............... 370/310, 310.2, 328, 338, 349, 254
See application file for complete search history.

(56) References Cited

U.S. PATENT DOCUMENTS

| | | | |
|---|---|---|---|
| 5,195,392 A | 3/1993 | Moore et al. | 73/866.5 |
| 5,309,351 A | 5/1994 | McCain et al. | 364/132 |
| 5,442,639 A | 8/1995 | Crowder et al. | 371/20.1 |
| 5,903,455 A | 5/1999 | Sharpe, Jr. et al. | 364/188 |
| 6,033,226 A | 3/2000 | Bullen | 434/219 |

(Continued)

FOREIGN PATENT DOCUMENTS

| | | |
|---|---|---|
| CN | 101005351 A | 7/2007 |
| CN | 101420348 A | 4/2009 |

(Continued)

OTHER PUBLICATIONS

EPO Communication from corresponding European application No. 10730279.6 dated Jan. 13, 2012.

(Continued)

*Primary Examiner* — Brenda H Pham
(74) *Attorney, Agent, or Firm* — Christopher R. Christenson; Kelly, Holt & Christenson, PLLC

(57) ABSTRACT

A method of commissioning a wireless field device is provided. The method includes communicatively coupling a handheld field maintenance tool to the wireless field device to obtain a wireless field device identifier. A wireless network is selected. Wireless communication is generated between the handheld field maintenance tool and a wireless gateway to automatically obtain a join key for the wireless field device identifier. The join key is written to the wireless field device with the handheld field maintenance tool.

13 Claims, 8 Drawing Sheets

(56) References Cited

U.S. PATENT DOCUMENTS

| | | | |
|---|---|---|---|
| 6,211,649 B1 | 4/2001 | Matsuda | 320/115 |
| 6,236,223 B1 | 5/2001 | Brady et al. | 324/750.3 |
| 6,377,859 B1 | 4/2002 | Brown et al. | 700/79 |
| 6,477,529 B1* | 11/2002 | Mousseau et al. | 1/1 |
| 6,633,782 B1 | 10/2003 | Schleiss et al. | 700/26 |
| 6,725,182 B2 | 4/2004 | Pagnano et al. | 702/188 |
| 6,971,063 B1 | 11/2005 | Rappaport et al. | 715/733 |
| 7,013,184 B2 | 3/2006 | Romagnoli et al. | 700/17 |
| 7,098,771 B2 | 8/2006 | Lefebvre et al. | |
| 7,188,200 B2 | 3/2007 | Griech | 710/100 |
| 7,337,369 B2 | 2/2008 | Barthel et al. | 714/43 |
| 7,400,255 B2 | 7/2008 | Horch | 340/572.7 |
| 7,421,531 B2 | 9/2008 | Rotvold et al. | 710/305 |
| 7,454,252 B2 | 11/2008 | El-Sayed | 700/21 |
| 7,505,819 B2 | 3/2009 | El-Sayed | 700/21 |
| 7,506,812 B2 | 3/2009 | von Mueller et al. | 235/449 |
| 7,675,406 B2 | 3/2010 | Baier et al. | 340/506 |
| 7,733,833 B2 | 6/2010 | Kalika et al. | 370/338 |
| 7,797,061 B2 | 9/2010 | El-Sayed | 700/21 |
| 7,840,912 B2 | 11/2010 | Elias et al. | 715/863 |
| 7,940,508 B2 | 5/2011 | Helfrick et al. | 361/119 |
| 7,965,664 B2 | 6/2011 | Hodson et al. | 370/310 |
| 8,000,815 B2 | 8/2011 | John et al. | 700/18 |
| 8,036,007 B2 | 10/2011 | Woehrle | 363/65 |
| 8,059,101 B2 | 11/2011 | Westerman et al. | 345/173 |
| 8,060,862 B2 | 11/2011 | Eldridge et al. | 717/121 |
| 8,060,872 B2 | 11/2011 | Da Silva Neto | 717/177 |
| 8,074,172 B2 | 12/2011 | Kocienda et al. | 715/263 |
| 8,126,145 B1* | 2/2012 | Tewari et al. | 380/255 |
| 8,150,462 B2 | 4/2012 | Guenter et al. | 455/557 |
| 8,180,948 B2 | 5/2012 | Kreider et al. | 710/313 |
| 8,208,635 B2 | 6/2012 | Karschnia | |
| 8,224,256 B2 | 7/2012 | Citrano, III et al. | 455/67.11 |
| 2001/0047504 A1 | 11/2001 | Aoyama | 714/799 |
| 2002/0004370 A1 | 1/2002 | Stengele et al. | 455/39 |
| 2002/0007237 A1 | 1/2002 | Phung et al. | 701/33 |
| 2002/0027504 A1 | 3/2002 | Davis et al. | 340/540 |
| 2002/0086642 A1 | 7/2002 | Ou et al. | 455/69 |
| 2002/0167904 A1 | 11/2002 | Borgeson et al. | 370/241 |
| 2002/0171558 A1 | 11/2002 | Bartelheim et al. | 340/825.49 |
| 2002/0188466 A1 | 12/2002 | Barrette et al. | 705/2 |
| 2003/0050737 A1 | 3/2003 | Osann, Jr. | 700/276 |
| 2003/0109937 A1 | 6/2003 | Zielinski et al. | 700/1 |
| 2003/0204373 A1 | 10/2003 | Zielinski et al. | 702/184 |
| 2003/0229472 A1 | 12/2003 | Kantzes et al. | 702/183 |
| 2004/0039458 A1 | 2/2004 | Mathiowetz et al. | 700/17 |
| 2004/0111238 A1 | 6/2004 | Kantzes et al. | 702/183 |
| 2004/0193287 A1 | 9/2004 | Lefebvre et al. | 700/1 |
| 2004/0204193 A1 | 10/2004 | Li et al. | 455/575.1 |
| 2004/0228184 A1 | 11/2004 | Mathiowetz | 365/202 |
| 2004/0230327 A1 | 11/2004 | Opheim et al. | 700/83 |
| 2005/0114086 A1 | 5/2005 | Zielinski et al. | 702/184 |
| 2005/0164684 A1 | 7/2005 | Chen et al. | 455/414.1 |
| 2005/0222698 A1 | 10/2005 | Eryurek et al. | 700/90 |
| 2005/0223120 A1 | 10/2005 | Scharold et al. | 710/1 |
| 2006/0014533 A1 | 1/2006 | Warren | 455/423 |
| 2006/0087402 A1 | 4/2006 | Manning et al. | 340/3.1 |
| 2006/0155908 A1 | 7/2006 | Rotvold et al. | 710/315 |
| 2006/0161393 A1 | 7/2006 | Zielinski et al. | 702/184 |
| 2006/0206277 A1 | 9/2006 | Horch | 702/82 |
| 2006/0290496 A1 | 12/2006 | Peeters | 340/572.1 |
| 2006/0291438 A1 | 12/2006 | Karschnia et al. | 370/338 |
| 2007/0161352 A1 | 7/2007 | Dobrowski et al. | 455/69 |
| 2007/0161371 A1 | 7/2007 | Dobrowski et al. | 455/423 |
| 2007/0179645 A1 | 8/2007 | Nixon et al. | 700/83 |
| 2007/0208279 A1 | 9/2007 | Panella et al. | 600/595 |
| 2008/0114911 A1 | 5/2008 | Schumacher | 710/72 |
| 2008/0234837 A1 | 9/2008 | Samudrala et al. | 700/19 |
| 2008/0268784 A1 | 10/2008 | Kantzes et al. | 455/66.1 |
| 2009/0065578 A1 | 3/2009 | Peterson et al. | 235/382 |
| 2009/0094466 A1 | 4/2009 | Matthew et al. | 713/300 |
| 2009/0125713 A1 | 5/2009 | Karschnia | |
| 2009/0171483 A1 | 7/2009 | Scheuermann | 700/83 |
| 2009/0177970 A1 | 7/2009 | Jahl et al. | 715/735 |
| 2009/0271726 A1 | 10/2009 | Gavimath et al. | 715/771 |
| 2009/0284390 A1 | 11/2009 | Lahner et al. | 340/825.49 |
| 2009/0296601 A1* | 12/2009 | Citrano et al. | 370/254 |
| 2009/0326852 A1 | 12/2009 | Vetter et al. | 702/108 |
| 2010/0100766 A1 | 4/2010 | Bengtsson et al. | 714/23 |
| 2010/0114347 A1 | 5/2010 | Dheenathayalan et al. | 700/97 |
| 2010/0114549 A1 | 5/2010 | Kolavi | 703/13 |
| 2010/0145476 A1 | 6/2010 | Junk et al. | 700/7 |
| 2010/0220630 A1 | 9/2010 | Kalika et al. | 370/254 |
| 2010/0290084 A1 | 11/2010 | Russell, III et al. | 358/1.15 |
| 2010/0290359 A1 | 11/2010 | Dewey et al. | 370/252 |
| 2010/0293363 A1 | 11/2010 | Meyer et al. | 713/1 |
| 2011/0117529 A1 | 5/2011 | Barash et al. | 434/265 |
| 2011/0238188 A1 | 9/2011 | Washiro | 700/19 |
| 2012/0038458 A1 | 2/2012 | Toepke et al. | 340/6.1 |
| 2012/0038548 A1 | 2/2012 | Toepke et al. | 345/156 |
| 2012/0038760 A1 | 2/2012 | Kantzes et al. | 348/61 |
| 2012/0040316 A1 | 2/2012 | Mathiowetz et al. | 434/219 |
| 2012/0040698 A1 | 2/2012 | Ferguson et al. | 455/457 |
| 2012/0041744 A1 | 2/2012 | Kantzes et al. | 703/13 |
| 2012/0046911 A1 | 2/2012 | Mathiowetz et al. | 702/184 |

FOREIGN PATENT DOCUMENTS

| | | |
|---|---|---|
| CN | 101763576 | 6/2010 |
| DE | 10245176 | 4/2004 |
| DE | 102007035158 | 1/2009 |
| DE | 102008029406 | 12/2009 |
| DE | 102009028195 | 2/2011 |
| EP | 1515208 | 3/2005 |
| EP | 1916582 | 4/2008 |
| EP | 2071427 | 6/2009 |
| EP | 2077473 | 7/2009 |
| EP | 2148259 | 1/2010 |
| EP | 2204705 | 7/2010 |
| GB | 2382418 | 5/2003 |
| GB | 2 394 124 | 4/2004 |
| JP | 9051583 | 2/1997 |
| JP | 2001337004 | 7/2001 |
| JP | 2007-91381 | 4/2007 |
| JP | 2008165193 | 7/2008 |
| JP | 2009105895 | 5/2009 |
| KR | 20060078883 | 7/2006 |
| WO | WO 01/35190 | 5/2001 |
| WO | WO 02/086662 | 10/2002 |
| WO | WO 2006/016845 | 2/2006 |
| WO | WO 2008/042074 | 4/2008 |
| WO | WO 2008/077358 | 7/2008 |
| WO | WO 2008/087571 | 7/2008 |
| WO | WO 2008/096216 | 8/2008 |
| WO | WO 2008/127632 | 10/2008 |
| WO | WO 2009/003146 | 12/2008 |
| WO | WO 2009/003148 | 12/2008 |
| WO | WO 2009/074544 | 6/2009 |

OTHER PUBLICATIONS

EPO Communication from related European application No. 10730281.2 dated Jan. 13, 2012.
EPO Communication from related European application No. 10725543.2 dated Jan. 12, 2012.
Notification of Transmittal of the International Search Report and the Written Opinion for the International application No. PCT/US2010/034848 dated Aug. 26, 2010.
Invitation to Pay Additional Fees for international patent application No. PCT/US2010/034949 dated Sep. 17, 2010.
Technical Data Sheet: VIATOR® USB HART® Interface (Model 010031). MACTek Measurement and Control Technologies.
VIATOR® Bluetooth® Wireless Technology Interface for use with HART field devices. MACTek Measurement and Control Technologies retrieved from www.mactekcorp.com/product5.htm.
Product Data Sheet: VIATOR RS232. MACTek Measurement and Control Technologies retrieved from www.mactekcorp.com/product1.htm.
Notification of Transmittal of the International Search Report and the Written Opinion from the International Application No. PCT/US2010/021764.
Possio Bluetooth to WLAN Gateway PX20: Full Product Description retrieved from http://www.blueunplugged.com/p.aspx?p=105816.

(56) References Cited

OTHER PUBLICATIONS

1420 Wireless Gateway: Product Data Sheet 00813-0100-4420, Rev BA Mar. 2008. Emerson Process Management.
Smart Wireless Gateway (WirelessHART™). Quick Installation Guide 00825-0200-4420, Rev BA. Aug. 2009. Emerson Process Management.
1420 Wireless Gateway. Reference Manual 00809-0100-4420, Rev BA. Aug. 2007. Emerson Process Management.
Rosemount 3051S Wireless Series Scalable Pressure, Flow, and Level Solutions. Reference Manual 00809-0100-4802, rev BA. Aug. 2007. Emerson Process Management.
Invitation to Pay Additional Fees for international patent application No. PCT/US2010/034889 dated Sep. 15, 2010.
ABB Limited: "Wireless Instrumentation Jargon Buster". Information bulletin instrumentation ABB No. IB/INST-018, Mar. 3, 2009, XP002596601. Retrieved from the Internet: URL:http://www05.abb.com/global/scot/scot203.nsf/veritydisplay/be00ec76ef07e978c125756e003157b9/$File/IB__INST__018__1.pdf.
David Gustafsson: "WirelessHART—Implementation and Evaluation on Wireless Sensors". Masters's Degree Project, KTH University, Electrical Engineering, Apr. 1, 2009, pp. I-39, XP002596602, Stockholm, Sweden. Retrieved from the Internet: URL:http://www.ee.kth.se/php/modules/publications/reports/2009/XR-EE-RT%202009:003.pdf.
EPO Communication pursuant to Rules 161(1) and 162 EPC for European patent application No. 10701430.0 dated Aug. 30, 2011.
Notification of Transmittal of the International Search Report and the Written Opinion from the International Application No. PCT/US2010/034889.
Notification of Transmittal of the International Search Report and the Written Opinion from the International Application No. PCT/US2010/034949.
Office Action from corresponding Japanese patent application No. 2012511041, dated Feb. 12, 2013.
First Communication for the related European patent application No. 107302812 dated Oct. 11, 2012.
International Search Report and Written Opinion from the related International patent application No. PCT/US2011/045664 dated Nov. 6, 2012.
International Search Report and Written Opinion from the related International patent application No. PCT/US2011/045679 dated Nov. 6, 2012.
International Search Report and Written Opinion from the related International patent application No. PCT/US2011/045665 dated Nov. 6, 2012.
First Communication from related European patent application No. 107255432 dated Oct. 11, 2012.
First Communication from corresponding European patent application No. 107302796 dated Oct. 19, 2012.
Notification from the corresponding Russian patent application No. 2011151099, dated Jan. 25, 2013.
Office Action from related Russian application No. 2011151063 dated Nov. 12, 2012.
First Office Action from related Japanese application No. 2015511048, dated Jan. 29, 2013.
Rosemount 3051SMV Quick Installation Guide 00825-0100-4803 Rev BA. Apr. 2011.
Notification of Transmittal of the International Search Report and the Written Opinion from the International Application No. PCT/US2011/045680 dated Jul. 6, 2012.
Notification of Transmittal of the International Search Report and the Written Opinion from the International Application No. PCT/US2011/045681 dated Jan. 5, 2012.
Invitation to Pay Additional Fees from the International Application No. PCT/US2011/045673 dated Jan. 16, 2012.
475 Field Communicator. User's Guide XP007919976. Aug. 2009. www.fieldcommunicator.com by Emerson Process Management.
Bushman J B: "Ally: An Operator's Associate for Cooperative Supervisory Control Systems", IEEE Transactions on Systems, Man and Cybernetics, IEEE Inc. New York, US, vol. 23, No. 1, Jan. 1, 1993, pp. 111-128.
Invitation to pay additional fees from the related International patent application No. PCT/US2011/045679 dated Aug. 6, 2012.
Invitation to pay additional fees from the related International patent application No. PCT/US2011/045664 dated Aug. 9, 2012.
Invitation to pay additional fees from the related International patent application No. PCT/US2011/045676 dated Jul. 30, 2012.
Lee S W et al: "Honam Petrochemical Corporation Uses Simulator for Ethylene Plant Operator Training", Processing of the Industrial Computing Conference. Houston, Oct. 18-23, 1992. pp. 219-222.
Kurrle H-P et al.: "Trainingssimulator Zur Ausbildung Von Chemikanten und Anlagenfahrern. Otraining Simulator for the Training of Process Workers (Chemikanten) and Operators", Automatisierungstechnische Praxis—ATP, Oldenbourg Indusrieverlag, Munchen, DE, vol. 36, No. 7, Jul. 1, 1994. Abstract, Section 2.
Invitation to pay additional fees from the related International patent application No. PCT/US2011/045665 dated Aug. 23, 2012.
First Office Action from counterpart Chinese patent application No. 201080011950.4, issued on Oct. 12, 2013. 20 pages.
Russian Official Action dated May 30, 2013 in foreign application No. 2011151099, filed May 14, 2010. 7 pgs. With English Translation.
Second Office Action from counterpart Chinese patent application No. 201080011950.4, issuing date Jun. 13, 2014. 18 pages.

* cited by examiner

1. RETRIEVE DEVICE ID

2. PLACE THE DEVICE ON THE ACCESS CONTROL LIST

3. RECORD NETWORK ID AND JOIN KEY

4. CONNECT TO DEVICE

5. KEY IN JOIN KEY AND NETWORK ID

1. CONNECT TO DEVICE

2. USER SELECTS THE WIRELESS NETWORK TO JOIN

3. HANDHELD GENERATES A JOIN KEY AND WRITES IT AND THE NETWORK id TO THE DEVICE. MATCHES THE JOIN KEY AGAINST THE DEVICE ID.

4. HANDHELD WRITES THE JOIN KEY AND MATCHING DEVICE ID TO THE ACCESS CONTROL LIST

MAINTENANCE OF WIRELESS FIELD DEVICES

CROSS-REFERENCE TO RELATED APPLICATION

The present application is based on and claims the benefit of U.S. provisional patent application Ser. No. 61/178,757, filed May 15, 2009, the content of which is hereby incorporated by reference in its entirety.

BACKGROUND

In industrial settings, control systems are used to monitor and control industrial and chemical processes, and the like. Typically, the process control system performs these functions using field devices distributed at key locations in the industrial process and coupled to the control circuitry in the control room by a process control loop. Field devices generally perform a function, such as sensing a parameter or operating upon the process, in a distributed control or process monitoring system.

Some field devices include a transducer. A transducer is understood to mean either a device that generates an output signal based on a physical input or that generates a physical output based on an input signal. Typically, a transducer transforms an input into an output having a different form. Types of transducers include various analytical equipment, pressure sensors, thermistors, thermocouples, strain gauges, flow transmitters, positioners, actuators, solenoids, indicator lights, and others.

Some process installations may involve highly volatile, or even explosive, environments. Accordingly, it is often beneficial, or even required, for field devices and the handheld field maintenance tools used with such field devices to comply with intrinsic safety requirements. These requirements help ensure that compliant electrical devices will not generate a source of ignition even under fault conditions. One example of Intrinsic Safety requirements is set forth in: APPROVAL STANDARD INTRINSICALLY SAFE APPARATUS AND ASSOCIATED APPARATUS FOR USE IN CLASS I, II and III, DIVISION NUMBER 1 HAZARDOUS (CLASSIFIED) LOCATIONS, CLASS NUMBER 3610, promulgated by Factory Mutual Research October, 1998. Examples of handheld field maintenance tools that comply with intrinsic safety requirements includes those sold under trade designations Model 375 Field Communicator and Model 475 Field Communicator, available from Emerson Process Management of Austin, Tex.

Typically, each field device also includes communication circuitry that is used for communicating with a process control room, or other circuitry, over a process control loop. Traditionally, analog field devices have been connected to the control room by two-wire process control current loops, with each device being connected to the control room by a single two-wire control loop. In some installations, wireless technologies have begun to be used to communicate with field devices. Wireless operation simplifies field device wiring and set-up.

One wireless process communication technology standard is known as the WirelessHART standard. The WirelessHART standard was published by the HART Communication Foundation in September 2007. Relevant portions of the Wireless HART® Specification include: HCF_Spec 13, revision 7.0; HART Specification 65—Wireless Physical Layer Specification; HART Specification 75—TDMA Data Link Layer Specification (TDMA refers to Time Division Multiple Access); HART Specification 85—Network Management Specification; HART Specification 155—Wireless Command Specification; and HART Specification 290—Wireless Devices Specification.

Another wireless network communication technology is set forth in ISA100.11a. This technology proposes wireless communication at the 2.4 GHz frequency using radio circuitry in accordance with IEEE 802.15.4-2006. The ISA100.11 standard is maintained by the International Society of Automation (ISA).

While these wireless communication technologies provide important advantages to the art of process control and communication, traditional techniques for maintaining and configuring wireless field devices that employ such communication is sometimes rendered inefficient.

SUMMARY

A method of commissioning a wireless field device is provided. The method includes communicatively coupling a handheld field maintenance tool to the wireless field device to obtain a wireless field device identifier. A wireless network is selected. Wireless communication is generated between the handheld field maintenance tool and a wireless gateway to automatically obtain a join key for the wireless field device identifier. The join key is written to the wireless field device with the handheld field maintenance tool.

DETAILED DESCRIPTION

Process communication and control systems are responsible for measuring and controlling process parameters that control such critical processes as oil refining, pharmaceutical manufacturing, and food preparation, to name a few. Exacting control of such processes is vitally important to ensure that the product that is processed is done so according to strict specifications, and done so without risking damage or injury to the process or those associated with the process. In wire-connected process control installations, such as the Highway Addressable Remote Transducer (HART®) protocol, or the FOUNDATION™ Fieldbus protocol, the devices are all configured based upon physical connections to the process communication loop. In distinct contrast, while the utilization of wireless communication for field devices has vastly simplified wiring, and maintenance, it is vitally important that only authorized devices are allowed to communicate on such wireless process communication loops. Further, since multiple such process communication loops may exist in proximity to one another, it is also important that a wireless field device be specifically configured for the wireless process communication loop to which it is intended. Currently, this is performed by manually entering a network identifier as well as a join key into a wireless field device before that device can communicate on the wireless process communication network. This requires the physical proximity of a laptop computer, or handheld field maintenance device, that physically couples to the terminals of a wireless field device. The laptop computer or handheld field maintenance tool then communicates with the wireless field device through the wired connection to allow the technician to enter the correct network identifier and join key into the wireless field device. Thereafter, the laptop computer or handheld field maintenance tool may be disconnected from the wireless field device and the wireless field device will subsequently join the correct wireless process communication loop. Once the wireless field device has joined the wireless process communication loop, a variety of features relative to the wireless field device are available to users and/or technicians via the wireless process communication loop.

In some instances, enhanced network security is provided by maintaining an access control list, or white list, of approved wireless field devices in a wireless gateway device. Accordingly, not only must the wireless field device have the correct network identifier, and join key to join the wireless network, but its own device identifier, such as a device tag or MAC address must be entered into the wireless gateway. The commissioning, provisioning, and/or verification of such wireless field devices currently require inefficient excursions to the physical proximity of each such field device. These limitations will be illustrated below with respect to FIGS. 1 and 2.

Figure 1:
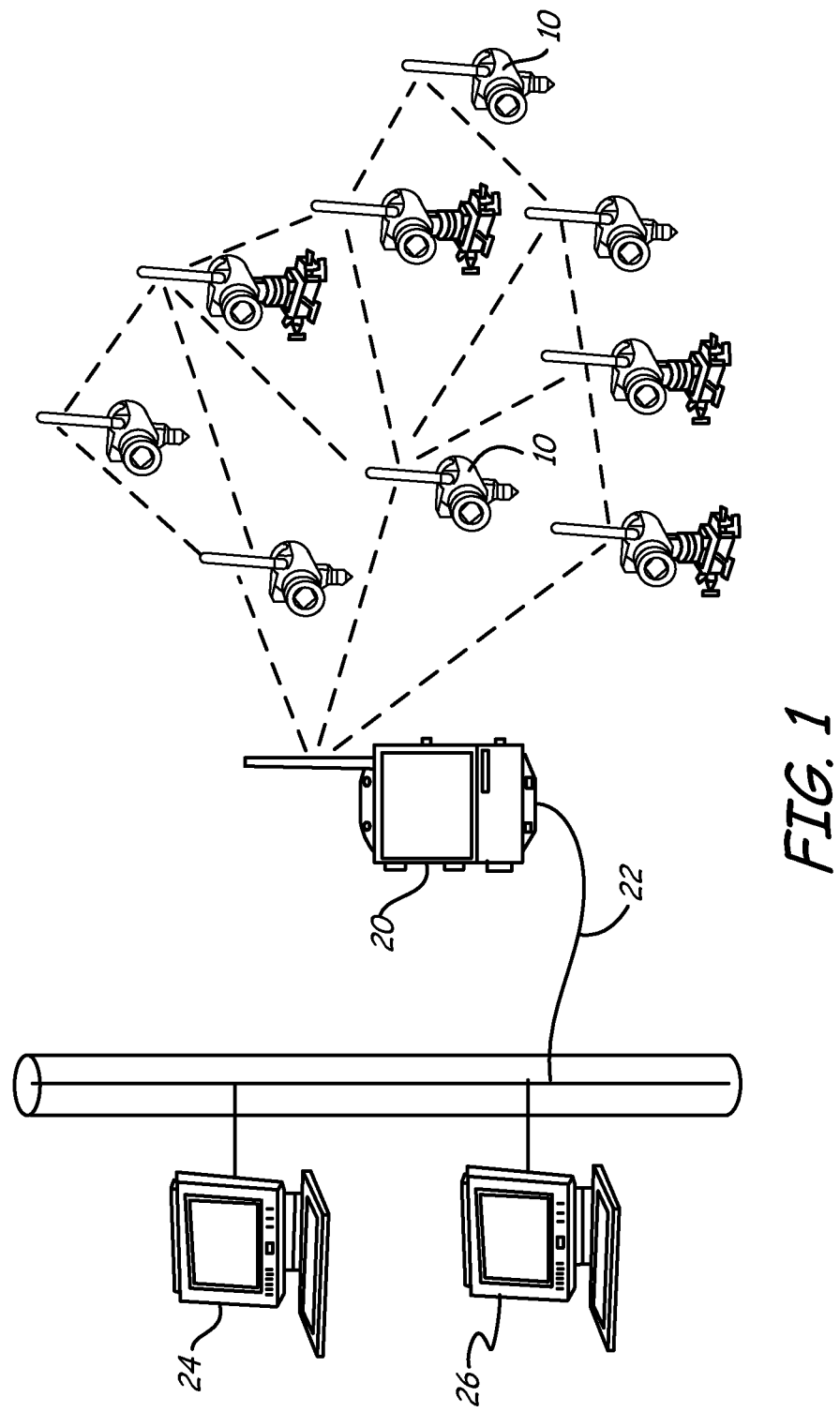
FIG. 1 is a diagrammatic view of a wireless process control environment in which embodiments of the present invention are particularly useful.

FIG. 1 is a diagrammatic view of a wireless process control environment in which embodiments of the present invention are particularly useful. As illustrated in FIG. 1, a plurality of wireless field devices 10 are communicatively coupled either directly or indirectly via wireless communication to wireless gateway 20. A wireless gateway is typically made up of multiple network components. These components include a gateway component, a security manager component, and a network manager component. While all components are typically present in a single gateway device, these components could be separate devices. Wireless field devices 10 are generally illustrated as wireless process variable transmitters, such as those sold under the trade designation Model 3051S wireless pressure transmitter, from Emerson Process Management, of Chanhassen, Minn. However, those skilled in the art will recognize that wireless field devices 10 can include other types of wireless process variable transmitters, as well as wireless actuators, valve positioners, et cetera. Wireless gateway 20 is configured to communicate with wireless field devices 10 using known wireless process communication protocols, such as the WirelessHART protocol described above. One example of a wireless gateway is sold under the trade designation Model 1420 by Emerson Process Management, of Chanhassen, Minn. Wireless gateway 20 includes one or more wired ports that are configured to couple to a local area network, such as an Ethernet local area network as illustrated at reference numeral 22. By virtue of its wired connection, wireless gateway 20 can provide information to and receive information from any device coupled to local network 22 such as work stations 24 and 26.

The wireless field device network illustrated in FIG. 1 can be considered a mesh network in that some of the field devices communicate with other field devices to pass their communication ultimately on to wireless gateway 20. Thus, a field device that is located too far away from wireless gateway 20 to otherwise communicate directly, can still provide wireless process communication by virtue of communication through one or more other wireless field devices.

In order for a wireless field device to communicate on a wireless process communication loop, it is necessary for the wireless field device to be configured with the proper network identifier, and have a join key that allows access to the wireless process communication network. Further, in many instances, wireless gateways employ an access control list, or white list, that maintains a specific listing of allowed wireless field devices on the wireless communication loop. When it becomes necessary to commission a new wireless field device, the process is currently somewhat cumbersome.

Figure 2A:
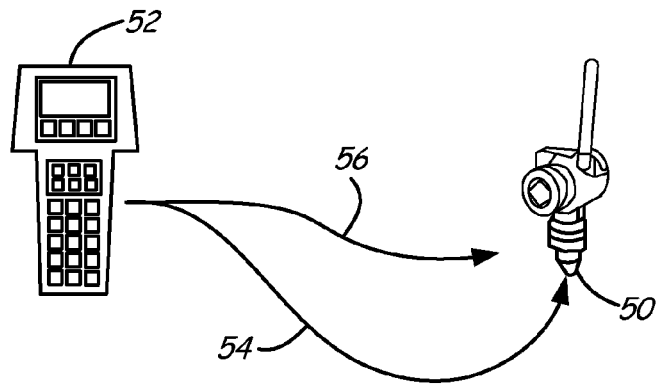
FIGS. 2A-2E illustrate a current method for commissioning wireless field devices.
Figure 2B:
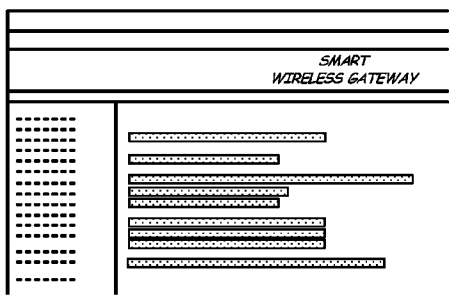
Figure 2C:
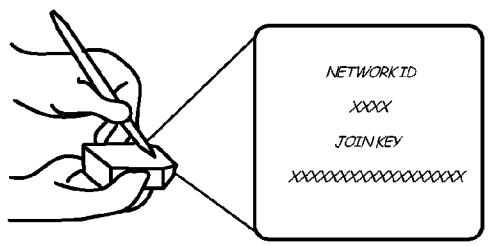
Figure 2D:
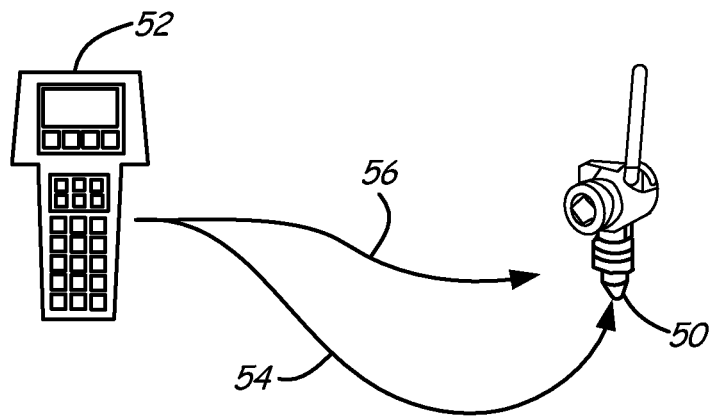
Figure 2E:
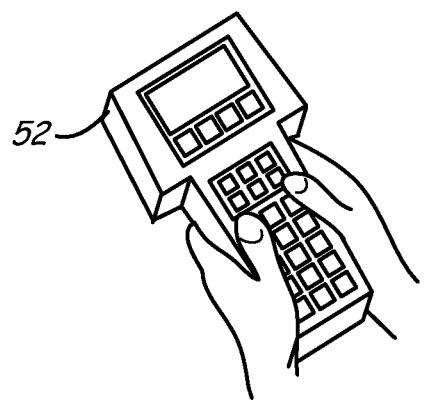

FIG. 2A illustrates a further step in a process of commissioning a new wireless field device 50. Generally, a handheld field maintenance tool, such as the Model 375 is coupled to the field device. The handheld field maintenance tool is illustrated at reference numeral 52. The pair of lines between handheld field maintenance tool 52 and wireless field device 50 indicates that the coupling between tool 52 and device 50 can be via a direct, wired coupling 54 or can be made wirelessly 56. In any event, once handheld field maintenance tool 52 is coupled to wireless field device 50, the wireless field device is accessed to obtain its device identification or identifier. This is typically known as a device tag, but can take any suitable form, including a media access controller (MAC) address, or other suitable form. Thereafter, the technician must gain communicative access to the wireless gateway. Generally, this includes returning to one of work stations 24, 26 (shown in FIG. 1) and accessing a user interface of gateway 20. An example of such a user interface is illustrated in FIG. 2B. The user then selects the appropriate network setup and adds the device identifier into the desired wireless process communication network. The wireless gateway provides the network ID as well as a join key to the user via the interface illustrated in FIG. 2B. The join key, for WirelessHART networks, are 128-bits and are typically entered as a 32 character hexadecimal string. However, other levels/method of security can also be used, such as larger keys, public key cryptography or a certificate file. The user must make note of the network identifier as well as the join key. Currently, this means physically hand writing the network identifier and the 32 character hexadecimal join key. As can be appreciated, the process is currently cumbersome, time consuming and prone to human error. Once the technician has the network identifier and join key, the user then connects again to device 50 as illustrated in FIG. 2D, and then manually enters the join key and the network identifier into handheld field maintenance tool 52 in order to configure wireless field device 50 with the network identifier and join key.

Embodiments of the present invention generally leverage enhanced wireless process communication of next-generation handheld field maintenance tools. This is particularly so in the case of provisioning, commissioning, or otherwise configuring wireless field devices. In contrast to the technique illustrated in FIGS. 2A-2E, FIG. 3 illustrates a method of commissioning a wireless field device in accordance with an embodiment of the present invention. Now, a user or technician can couple handheld field maintenance tool 100, or a host, such as a laptop or personal computer, directly to wireless field device 50 either via a wired connection, 54 or wirelessly 56. Once communicatively coupled to wireless field device 50, tool 100 allows a technician to simply select the wireless network to which wireless field device 50 will join. Tool 100 includes suitable circuitry, software, or both, to interact wirelessly directly with a wireless gateway, such as gateway 20. This communication preferably occurs while tool 100 is communicatively coupled to wireless field device 50.

Communication between the handheld field maintenance tool and wireless gateway can be performed in a number of ways. For example, handheld field maintenance tool 100 may include wireless communication circuitry to communicate directly through a wireless process communication loop. Accordingly, device 100 may simply communicate as another node on a mesh network thereby allowing ultimate communication with wireless gateway 20. In another example, handheld field maintenance tool 100 may include a form of wireless communication that can simply reach the wireless gateway directly, for example Wireless Fidelity (Wi-Fi) such as that in accordance with IEEE 802.11(a/b/g/n). In still another example, handheld field maintenance tool 100 may include cellular communication circuitry, such as known CDMA technology or GSM technology. In this manner, the handheld field maintenance tool would communicate via its cellular transceiver through a cellular network to communicate with wireless gateway 20. Certainly numerous other topologies and examples are possible. By virtue of the ability of handheld field maintenance tool 100 to communicate with wireless gateway 20, a number of provisioning and/or commissioning tasks can be performed automatically thereby simplifying the operations of the field maintenance technician. Specifically, once tool 100 is coupled to wireless field device 50, the user simply selects the wireless network that the device should join. Thereafter, the handheld field maintenance tool automates the process by communicating with the gateway or wireless network manager. The handheld field maintenance tool preferably goes through the following procedure automatically, however it is also contemplated that embodiments of the present invention can be practiced with user confirmation of each step. First, the handheld field maintenance tool will retrieve the device identifier from the wireless field device. Next, the handheld field maintenance tool automatically writes the device identifier to the access control list of the wireless gateway. The handheld field maintenance tool then will automatically retrieve the correct join key and network identifier from the wireless gateway. Finally, the handheld field maintenance tool automatically writes the network identifier and join key to the wireless field device. Accordingly, a single communicative session between the handheld field maintenance tool and the wireless field device is required.

Figure 3:
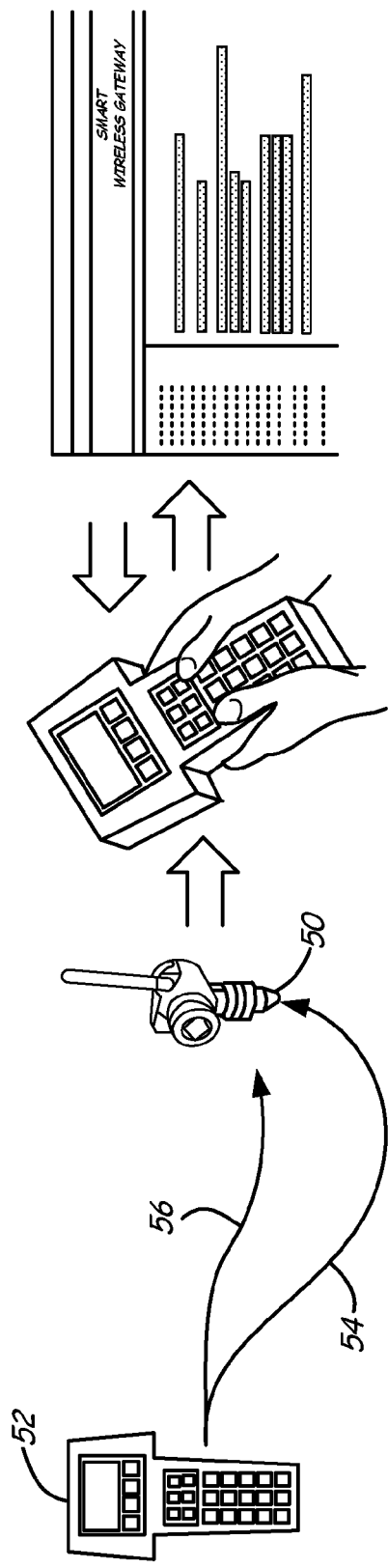
FIG. 3 illustrates a method of commissioning a wireless field device in accordance with an embodiment of the present invention.
Figure 4:
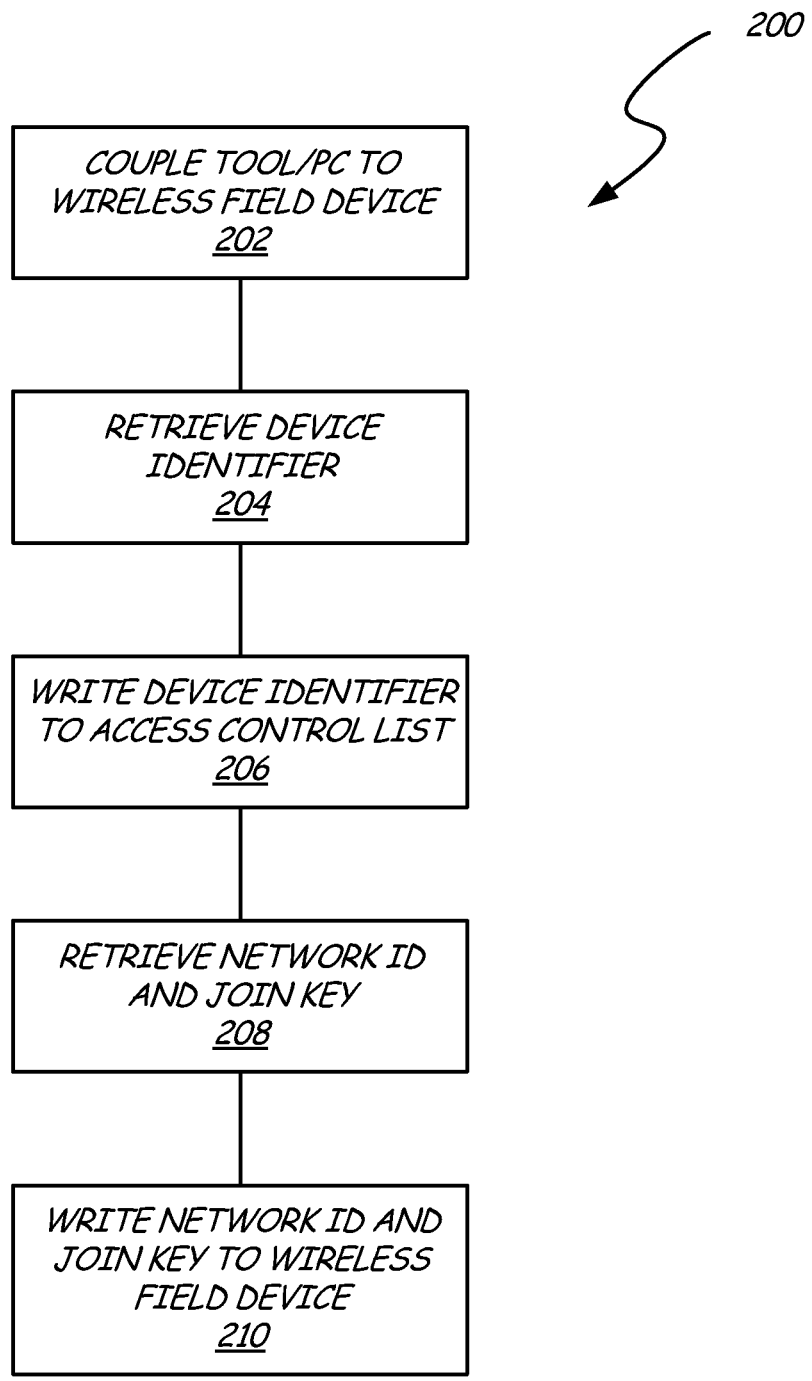
FIG. 4 is a flow diagram of a method of commissioning a wireless field device in accordance with the embodiment of a present invention.

FIG. 4 is a flow diagram of a method of commissioning a wireless field device in accordance with the embodiment of a present invention. Method 200 substantially sets forth the process described with respect to FIG. 3. Specifically, method 200 begins at block 202 where a handheld field maintenance tool is communicatively coupled to a wireless field device. Thereafter, the device identifier is retrieved from the wireless field device by the handheld field maintenance tool, or other suitable host, as illustrated at block 204. The device identifier is then written to an access control list of a wireless network security manager, such as a security manager component of a wireless gateway, as set forth at block 206. Next, the handheld field maintenance tool interacts with the wireless gateway to retrieve the correct network identifier and join key from the wireless gateway, as illustrated at block 208. Finally, the handheld field maintenance tool writes the retrieved network identifier and join key to the wireless field device as set forth at block 210.

The embodiment illustrated with respect to FIGS. 3 and 4 provides a number of advantages over current methods for commissioning or otherwise provisioning wireless field devices. Specifically, it is not necessary to manually record and input the device ID, join key and network identifier. It is believed that this will make the process more efficient and less prone to error. Further, by using the wireless communication of the handheld field maintenance tool, the user may be able to commission the field devices without having to go to another location, such as workstation 24 or 26, or communicate with someone near such a station. Thus, the entire process can be done while the technician is in the field.

Figure 5:
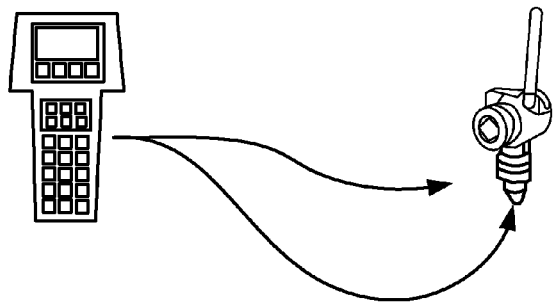
FIG. 5 is a diagrammatic view of another method for provisioning a wireless field device in accordance with the embodiment of the present invention.
Figure 5:
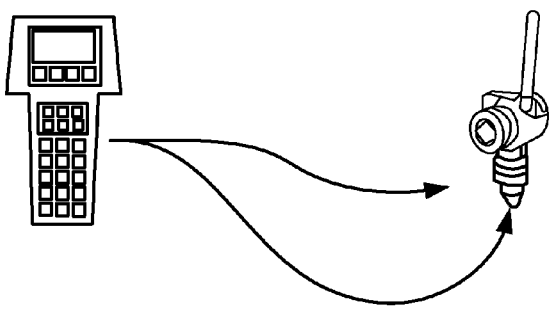
Figure 5:
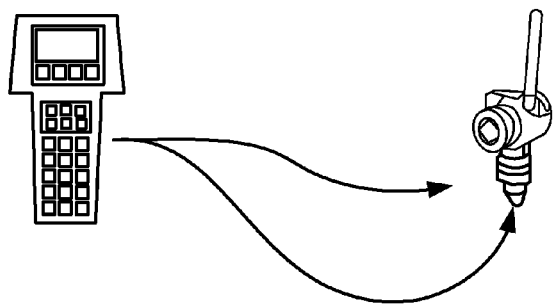
Figure 5:
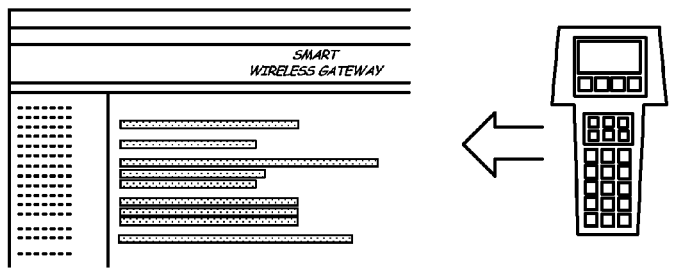

FIG. 5 is a diagrammatic view of another method for provisioning a wireless field device in accordance with the embodiment of the present invention. First, the user or technician communicatively couples a handheld field maintenance tool, or other suitable device, to a wireless field device. Next, the user selects the wireless network to join. The selections offered to the user via the handheld field maintenance tool can be done by detecting the current wireless process communication networks communicating in the proximity of device 50 or can simply be entered into the handheld field maintenance tool at an earlier time. Regardless, the user selects the wireless network to join via the handheld field maintenance tool, which then generates a join key and writes the join key and network identifier to the wireless field device as illustrated at numeral 3. Additionally, the handheld field maintenance tool preferably matches the join key against the device identifier. Subsequently, at numeral 4, the handheld field maintenance tool writes the network identifier, join key and matching device identifier to a local access control list into the memory of the handheld field maintenance tool for later transfer of the information to the wireless gateway or security manager. The method illustrated with respect to FIG. 5 is convenient in situations where the handheld field maintenance tool may not be able to communicate with the wireless gateway or network manager while it is coupled to the wireless field device. Thus, after the join key and network identifier have been written to the wireless device, the handheld field maintenance tool can be decoupled from the wireless field device and subsequently moved to a location where the handheld field maintenance tool can communicate with the wireless gateway or network manager. Once such communication is possible, the handheld field maintenance tool can automatically read the network identifier, join key and matching device identifier from memory and transfer it to the access control list of the appropriate wireless gateway or security manager. This allows the wireless field device to then join the correct network.

As illustrated in FIGS. 3 and 5, the handheld field maintenance tool can make either a wired or wireless connection to the wireless field device. In some embodiments, the handheld field maintenance tool can be configured, via hardware, software, or a combination thereof, to be a wireless sensor network manager. This helps automate the provisioning of multiple devices. As a security manager, such a device is able to detect WirelessHART devices and wirelessly write any desired network identifier and join key into each device. Of course, this assumes that non-commissioned devices have some default state that allows communication. For example, a non-commissioned wireless field device may have an initial setting to communicate with a default network having a network identifier of 0000, and a join key of all zeros. The wireless network manager could then detect such a wireless device and interact with it even though it had not been previously commissioned. Moreover, since wireless communication between the handheld field maintenance tool and the wireless field device is possible, it is not necessary to make any physical connection to the wireless field devices in order to configure them. Instead, the handheld field maintenance tool can run a software routine that configures each device with the appropriate network identifier and join key. Such a routine may configure the various devices within the communicative range of the wireless handheld field maintenance tool either serially, or in parallel. While embodiments of the present invention described above generally include the modification of an access control list or white list, to facilitate enhanced security, at least some embodiments of the present invention do not require the use of such a white list, but merely include the ability of a handheld field maintenance tool to wirelessly interact with one or more wireless field devices either serially or in parallel to write a network identifier and correct join key to each such device(s). Thus, a user does not need to physically connect to each device. Moreover, in some embodiments, the user need only perform one set of steps to provision multiple wireless field devices. It is believed that this would require less human effort, be faster, and more efficient than current practice.

Once a field device is commissioned, and can join a wireless process communication loop, it is sometimes necessary to confirm whether the wireless field device has joined the wireless network. In self-organizing networks, the installer is generally interested in seeing how many devices (including the wireless gateway) the newly installed wireless field device can communicate with and the quality of connection to each such device.

In order to gain access to the gateway, the installer generally had to plug into the gateway or be able to access a network that the gateway is plugged in to. In many cases, neither the gateway nor the network to which it is coupled is immediately accessible in the area in which the wireless field device is installed. In some circumstances, the network within which the field device is installed and the gateway may be miles away from the device installation site. Currently, an installer must install the wireless field device and then travel to the physical proximity of the gateway interface to check connectivity or use a phone or radio to communicate with another person who has access to such installation. The installer can then make adjustments to the wireless field device as required to improve the connectivity of the wireless field device to the network. As set forth above, some embodiments of the present invention allow the wireless handheld field maintenance tool to interact on a wireless process communication network or wireless mesh network. Thus, as long as the wireless handheld field maintenance tool can communicate with at least one wireless field device on the mesh network, it can access the wireless gateway. Such access to the wireless gateway allows the installer to determine whether the wireless field device is connected to the network, and also ascertain the quality of such connections. This can all be done, accordingly, by a single user in the proximity of the wireless field device. Accordingly, such confirmation is substantially simplified. It is believed that this will provide efficiency in the installation of wireless field devices since the installer will no longer need to go to a location where the connectivity information can be seen (which could be miles away) or require an additional person with access to the gateway via a phone or radio. In addition, the installer can view the device's connection data as it responds to the installer's actions in substantially real-time thereby providing the installer with a better understanding of which action(s) are yielding positive results (much like moving a TV antenna around and watching the signal improve or get worse).

Figure 6:
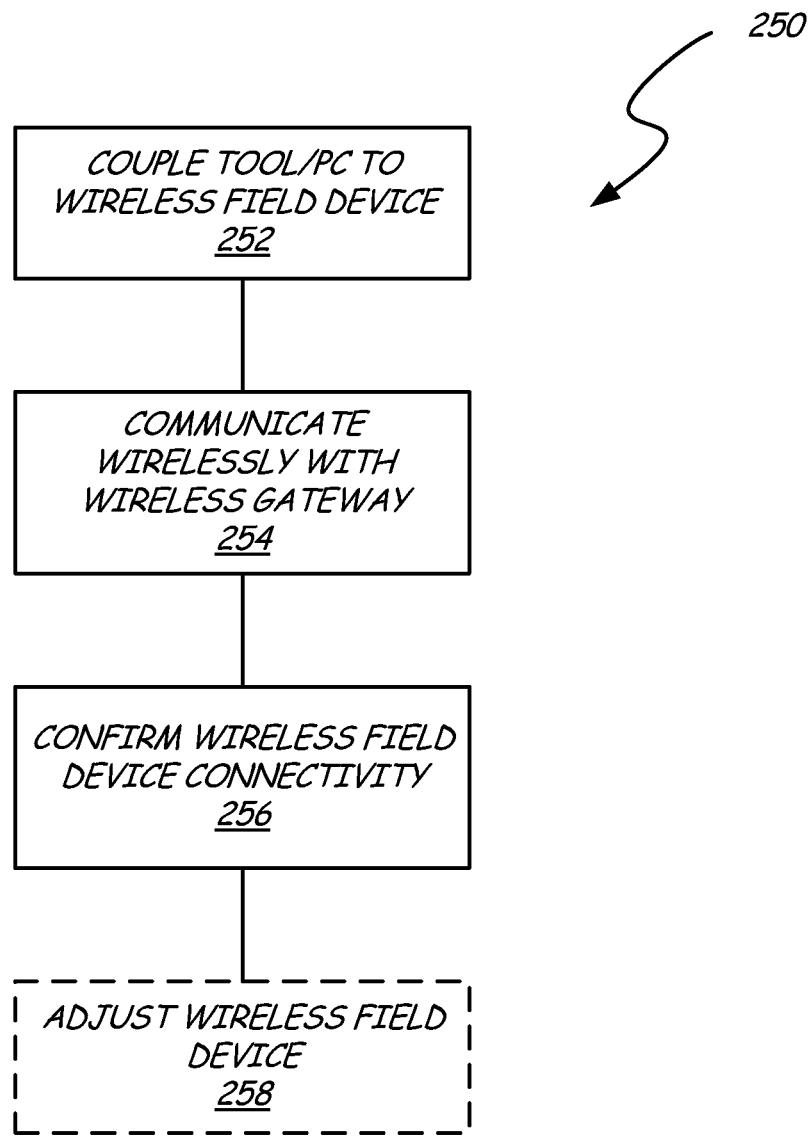
FIG. 6 is a flow diagram of a method of confirming wireless field device communication in accordance with the embodiment of the present invention.

FIG. 6 is a flow diagram of a method of confirming wireless field device communication in accordance with the embodiment of the present invention. Method 250 begins at block 252 where a technician or a user accesses a wireless field device. This access may be in the form of generating a physical, wired connection between a handheld field maintenance tool, or other suitable device, and the wireless field device. Alternatively, the access may be via wireless communication between a handheld field maintenance tool, or other suitable device, and the wireless field device. Next, at block 254, the handheld field maintenance device communicates with a wireless network manager or gateway. As set forth above, this communication can take many forms. The handheld field maintenance tool may communicate via the mesh network, if it is a member of the mesh network, or may communicate via wireless methods directly with the network manager or wireless gateway. Further still, the handheld field maintenance tool may communicate using any other suitable wireless communication, such as cellular communication or satellite communication, to transmit data to the wireless network manager or gateway via the Internet. Regardless, the user who is located in the physical proximity of the wireless field device has the ability, by virtue of the handheld field maintenance tool, to communicate with the wireless gateway. Accordingly, at block 256, the user can confirm connectivity with the wireless field device while still located in the physical proximity of the wireless field device. Further still, the user has the ability to view other parameters of the wireless field device including, but not limited to, field device connection strength and quality to other field devices in the communication range of the wireless field device. At optional block 258, the user may adjust the wireless field device, such as the orientation of the antenna, radio signal strength, et cetera, and view the effects of such adjustments in real-time while communicating with the wireless network manager or gateway.

Figure 7:
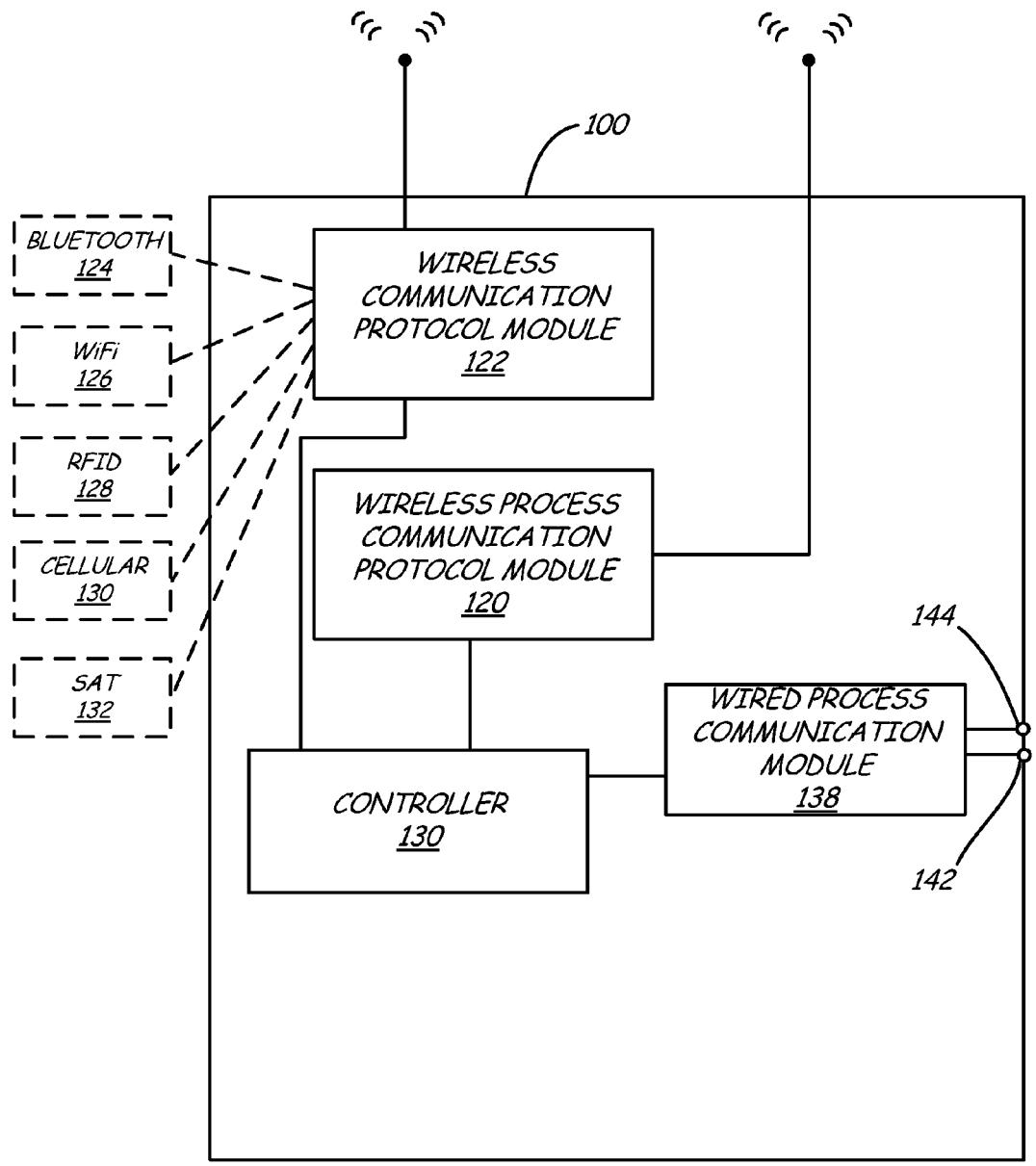
FIG. 7 is a diagrammatic system block diagram of a handheld field maintenance tool in accordance with the embodiment of the present invention.

FIG. 7 is a diagrammatic system block diagram of a handheld field maintenance tool in accordance with the embodiment of the present invention. Tool 100 is preferably self-powered using a rechargeable battery. Additionally, it is preferred that tool 100 comply with at least one intrinsic safety specification, such as that listed above, in order to help ensure safety in potentially explosive environments.

Handheld field maintenance tool 100 includes at least one wireless process communication module 120. Suitable examples for wireless process communication module 120 include a module that generates and/or receives proper signals in accordance with a known wireless communication protocol, such as the WirelessHART protocol described above. Another suitable wireless process communication protocol is that set forth in ISA100.11a described above. While FIG. 7 shows a single wireless process communication module 120, it is expressly contemplated that any suitable number of wireless process communication modules can be used to communicate in accordance with various wireless process communication protocols now in existence or later developed.

Handheld field maintenance tool 100 also includes at least one secondary wireless communication protocol module 122. Wireless communication protocol module 122 can communicate in accordance with one or more of the options shown in phantom in FIG. 7. Specifically, wireless communication protocol module 122 may communicate in accordance with a Bluetooth specification 124; a Wi-Fi specification 126; a known RFID specification 128; cellular communication techniques 130; satellite communication 132 or any other suitable wireless data communication technology such as WiMAX or 4G. While one wireless communication protocol module 122 is shown in FIG. 7, any suitable number may be used. Each of the wireless process communication protocol module 120 and wireless communication protocol module 122 is coupled to controller 130 which is also coupled to the wired process communication module 138. Controller 130 is preferably a microprocessor that executes a sequence of instructions to perform handheld field maintenance tasks. Wired process communication module 138 allows the handheld field maintenance tool to be physically coupled via a wired connection at terminals 142, 144 to a field device. Examples of suitable wired process communication include the highway addressable remote transducer (HART®) protocol, the FOUNDATION™ Fieldbus protocol, and others.

Although the present invention has been described with reference to particular embodiments, workers skilled in the art will recognize that changes may be made in form and detail without departing from the spirit and scope of the invention.

What is claimed is:

1. A method of commissioning a wireless field device, the method comprising:
    communicatively coupling a handheld field maintenance tool to the wireless field device to obtain a wireless field device identifier;
    selecting a wireless network;
    generating wireless communication between the handheld field maintenance tool and a wireless gateway, such that the handheld field maintenance tool directly communicates with the wireless gateway to automatically obtain a join key for the wireless field device identifier; and
    writing the join key obtained directly from the wireless gateway to the wireless field device with the handheld field maintenance tool.

2. The method of claim 1, wherein the communicative coupling between the handheld field maintenance tool and the wireless field device is a physically wired connection.

3. The method of claim 1, wherein the communicative coupling between the handheld field maintenance tool and the wireless field device is wireless.

4. The method of claim 1, wherein the wireless communication between the handheld field maintenance tool and the wireless gateway is in accordance with a wireless process communication protocol.

5. The method of claim 1, wherein the wireless communication between the handheld field maintenance tool and the wireless gateway includes cellular communication.

6. The method of claim 1, wherein the wireless communication between the handheld field maintenance tool and the wireless gateway includes satellite communication.

7. The method of claim 1, and further comprising automatically adding the wireless field device identifier to an access control list of the wireless gateway.

8. The method of claim 1, wherein the join key is a 128-bit, 32 character hexadecimal string.

9. The method of claim 1, and further comprising wirelessly communicating the join key and the wireless field device identifier to the wireless gateway from only the handheld field maintenance tool while the handheld field maintenance tool is communicatively coupled to the wireless field device.

10. The method of claim 1, and further comprising wirelessly communicating the join key and the wireless field device identifier to the wireless gateway from only the handheld field maintenance tool while the handheld field maintenance tool is communicatively decoupled to the wireless field device.

11. The method of claim 1, and further comprising matching the join key against the wireless field device identifier.

12. The method of claim 11, and further comprising automatically adding the join key to an access control list of the wireless gateway.

13. The method of claim 12, and further comprising automatically adding the matching of the join key against the wireless field device identifier to the access control list of the wireless gateway.

* * * * *

UNITED STATES PATENT AND TRADEMARK OFFICE
CERTIFICATE OF CORRECTION

| | | Page 1 of 1 |
|---|---|---|
| PATENT NO. | : 9,210,581 B2 | |
| APPLICATION NO. | : 12/780112 | |
| DATED | : December 8, 2015 | |
| INVENTOR(S) | : Toepke et al. | |

It is certified that error appears in the above-identified patent and that said Letters Patent is hereby corrected as shown below:

In the Specification

Column 7:
Line 7:

Delete "nm" insert --run--

Signed and Sealed this
Twenty-ninth Day of March, 2016

Michelle K. Lee
*Director of the United States Patent and Trademark Office*